Feb. 24, 1925.
W. M. REASON
1,527,822
LOCK DEVICE FOR AUTOMOBILES
Filed Aug. 9, 1923     2 Sheets-Sheet 2
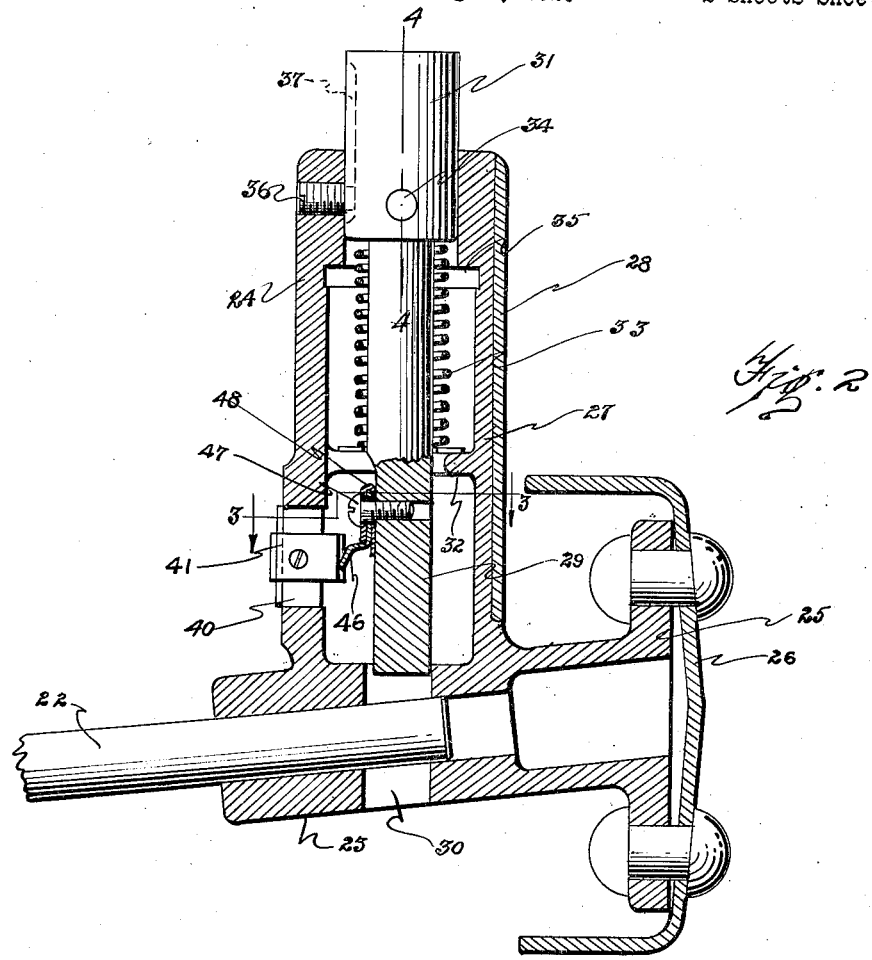
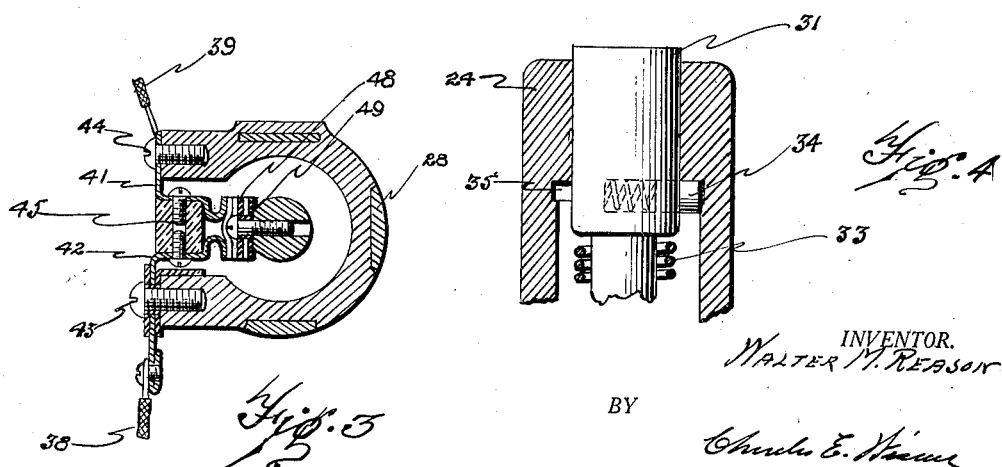
INVENTOR.
WALTER M. REASON
BY
ATTORNEY.

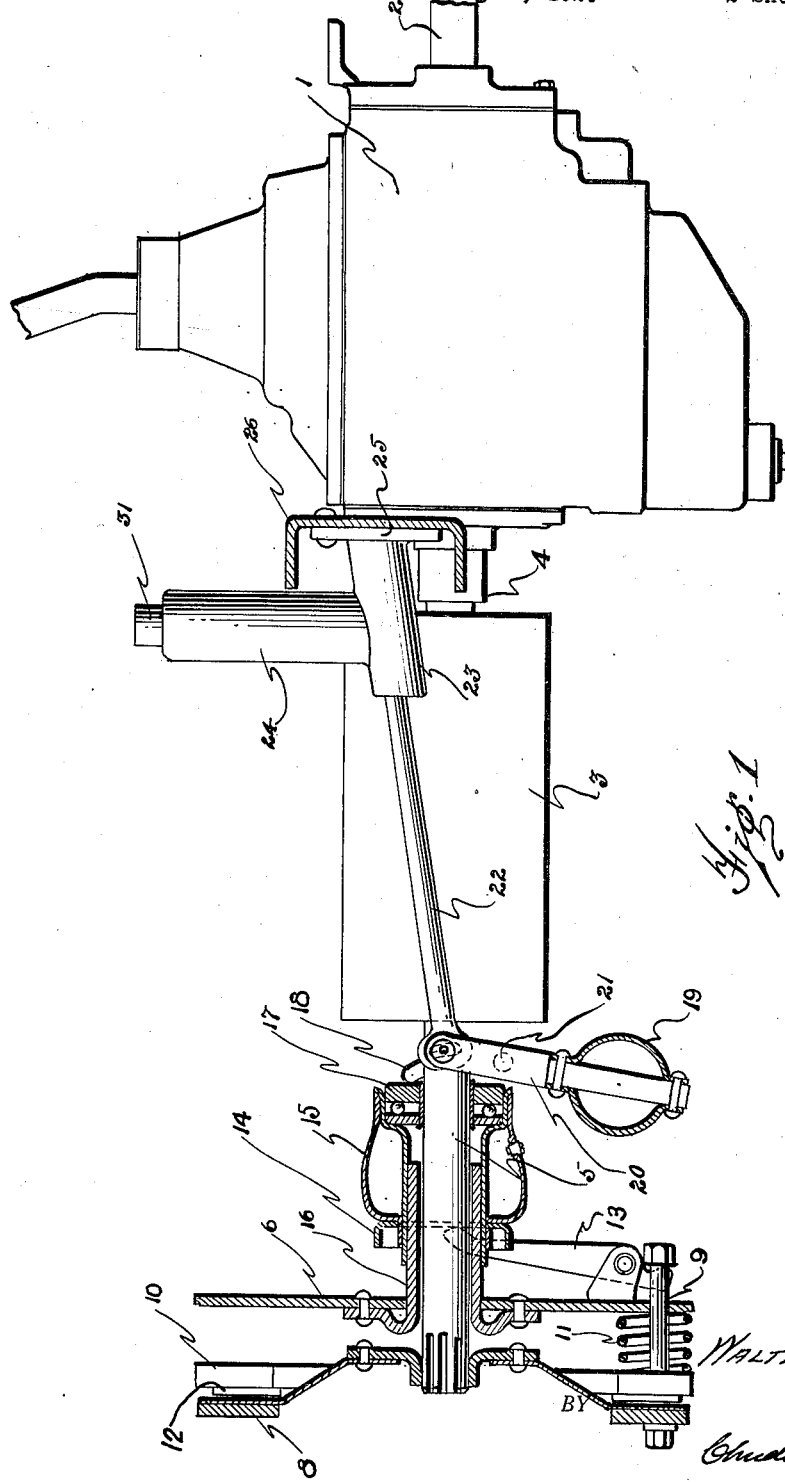

Patented Feb. 24, 1925.

1,527,822

UNITED STATES PATENT OFFICE.

WALTER M. REASON, OF PONTIAC, MICHIGAN.

LOCK DEVICE FOR AUTOMOBILES.

Application filed August 9, 1923. Serial No. 656,590.

*To all whom it may concern:*

Be it known that I, WALTER M. REASON, a citizen of the United States, residing at Pontiac, county of Oakland, State of Michigan, have invented a certain new and useful Improvement in Lock Devices for Automobiles, and declare the following to be a full, clear, and exact description of the same, such as will enable others skilled in the art to which it pertains to make and use the same, reference being had to the accompanying drawings, which form a part of this specification.

This invention relates to locking devices for automobiles, and the object of the invention is to provide a simple and efficient means for simultaneously breaking the ignition circuit of an internal combustion engine and disconnecting the power apparatus and driving wheels. At the present time, locks are provided for locking the transmission mechanism from operation, and a switch is provided for controlling the ignition circuit of the engine. With such former construction the operator oftentimes removes the key from the switch breaking the ignition circuit but does not lock the vehicle, and unauthorized persons find it an easy matter to complete the ignition circuit and drive the vehicle away. My invention seeks to provide a locking device compelling the operator to lock the vehicle in order to break the ignition circuit and thus practically eliminate theft of the vehicle.

Further, in former devices utilizing a transmission lock, it was also a simple matter to remove the transmission case cover with the lock and it is then an easy matter to shift the gears by means of an ordinary bar or heavy screw driver. A feature of this invention is in the provision of a lock structure which holds the clutch disconnected and simultaneously breaks the ignition circuit and in the arrangement of the lock whereby it is practically impossible for ordinary persons within a short period of time to move the lock or so disconnect the same as to release the clutch to establish driving connection between the engine and the driving wheels. It is also an object of this invention to provide a device of the character and having the function stated that is comparatively simple and inexpensive in construction that can be readily applied to an automobile. These and other objects and the several novel features of the invention are hereinafter more fully described and claimed, and the preferred form of construction of a locking device embodying my invention is shown in the accompanying drawings in which—

Fig. 1 is a side elevation partly in section showing my improved lock structure as applied to an automobile power transmission mechanism.

Fig. 2 is a vertical section through the lock structure.

Fig. 3 is a section taken on line 3—3 of Fig. 2.

Fig. 4 is a view taken on line 4—4 of Fig. 2.

I have here shown part only of the automobile structure—namely, the speed changing power transmission case 1, shaft 2 connected with the engine, the housing 3 connected with the shaft 4 of the transmission mechanism and the clutch shaft 5 which is connected with the housing 3. The clutch may be of any approved type and is here shown as being of what is known as the "plate" or "disk" type which has the loose plate or disk 6 connected through the case 7 with the driving shaft (not here shown) as will be readily understood by those familiar with this art. The case 7 provides a housing for the disk and a movable plate 8 is connected directly with the shaft 5 and rotatable therewith. Also carried by the disk 6 are several pins 9 engaging in the ring 10 and springs 11 are interposed between the ring 10 and plate 6 tending to force the fiber or cork face 12 of the ring into engagement with the plate 8 to frictionally connect the plate 8 with the plate 6 connected with the propeller shaft as above stated. To release the plate 10 I have provided several levers 13, only one of which is here shown. As is usual the levers 13 are pivoted to the member 6 and, by movement of the levers to the left of the position shown in Fig. 1, the clutch is released. The upper end of each lever 13, in the usual construction of this type of clutch, engages in a cupped member 14 at the rear of the thrust member 15 which is slidable on the hub 16 of the member 6. The thrust member 15 carries at the forward end a thrust bearing 17 and the usual releasing fork 18 engages against this thrust bearing at the upper end and is to be understood as being connected with the swinging bar 19 pivotally supported in the frame of the automobile (not here shown). The clutch releasing pedal (not here shown) is also to be understood as being connected with this bar 19 and by movement of the pedal in a forward direction by the foot of the operator, the fork 18 moves the thrust member 15 to the left of Fig. 1 releasing the clutch. The clutch structure above specifically mentioned is commonly in use and, while I have specifically described the clutch mechanism, it is to be understood that a clutch of any desired type may be utilized without departing from the spirit of this invention, and that my lock structure may be operatively connected with any of the usual types of clutch devices. The only change required to adapt the lock device for use with different types of clutches is to provide a means such as the bar 20 or an equivalent thereof connected to a member rocked or turned by the clutch lever to turn this lever 20 about the pivot point indicated at 21 so that when the clutch is released this member 20 will move the rod 22 corresponding to the clutch movement which is ordinarily about one-half an inch. As will be understood from Fig. 2, the forward end of this rod 22 rides in an aperture in a casting 23 which forms part of the housing and base or support for the lock device proper indicated generally by the numeral 24. This casting 23 is provided with a foot 25 riveted to the cross bar 26 extending between the side frames of the automobile structure usually forward of the clutch device and at about the rear of the transmission case. This casting 26 has an upwardly extending cylindrical part 27 and preferably in this part I have embedded several strips 28 of case hardened steel, there being preferably three as shown in Fig. 3, the purpose of which is to prevent cutting of the lock housing by a saw or the like in order to release the lock.

The lock consists of the lock bolt 29, the lower end of which, when the lock is in unlocked position as shown in Fig. 2, just enters the vertical aperture 30 in the part 23. It is to be noted that the forward end of the rod 22 connected with the clutch operating mechanism when the clutch is engaged extends just forward of this aperture 30 and therefore forward of the end of the bolt 29. Upon release of the clutch by movement of the clutch operating lever, this member 22 is withdrawn which permits the lock bolt 29 to be moved downward in the aperture 30 forward of the end of the rod 22 and when the lock bolt is held in this position prevents the rod 22 from moving forward due to connection of the rear end of the rod 22 with the member 20. This effectually holds the clutch disengaged thereby disconnecting the power apparatus from the propeller shaft.

Thus, by movement downward of the lock bolt by the foot of the operator when the clutch is disengaged, the clutch is held in disengaged position. The bolt 29 is held in locked position by the lock 31 at the upper end of the lock bolt. It is to be noted that an internal flange 32 is provided within the housing 27 and a coiled compression spring 33 extends between this flange and the lock case which tends to move the lock bolt to unlocked position. This lock is of the ordinary construction and is preferably of the key-operated type and a spring-pressed pin 34 is provided (shown more clearly in Fig. 4) which, on movement of the lock case and bolt downward by the foot of the operator, project beneath the shoulder 35 of the housing holding the lock case and bolt in its downward or locked position. The key functions in the usual manner withdrawing the pin 34 which releases the lock bolt and case to actuation by the spring 33 moving it from locked position indicated in Fig. 4 to unlocked position shown in Fig. 2. To prevent rotation of the lock case and bolt, I provide a pin or screw 36 in the side of the housing 27, the inner end of which engages in a slot 37 formed in the outer surface of the lock case. From this description it will be evident that to lock a car from operation, it is only necessary for the operator to move the case 31 and lock bolt 29 connected therewith downward at the time the clutch is disengaged. This movement positions the lower end of the bolt 29 across the end of the rod 22 thereby holding the clutch disengaged upon release of the clutch operating lever. It is also to be noted that a key is required to unlock the device to permit engagement of the clutch with the power apparatus.

With this structure I have combined a switch for the ignition circuit, the wires of which are indicated at 38 and 39 in Fig. 3. The housing 27 for the lock is provided with an aperture 40 and the contact devices, 41 on one side and 42 on the opposite side, are mounted by means of the screws 43 and 44 on the case 27 and extend into the aperture 40. These contact devices are preferably of the form shown and are connected together by a plug 45 of insulating material which stiffens and supports the same in the opening 40. The inner ends of the members 41 and 42 are reversely bent and connected across these ends to complete the circuit is the member 46 carried on the lock bolt 29 by means of the screw 47. This member 46 and also the members 41 and 42 are preferably of copper and the member 46 is covered by insulation 48 and the screw is also insulated from the member 46 by the tubular piece 49. It will be readily observed that, when the switch parts 41, 42, and 46 are in the position shown in Figs.

2 or 3, the ignition circuit is closed through the switch but, on movement of the lock bolt downward a short distance, the member 46 will move below and out of contact with the inner ends of the members 41 and 42 breaking the circuit. Preferably (although not necessarily) the relationship of the lock bolt 29 and inner end of the member 22 is such that when the lock is in unlocked position, as shown in Fig. 2, with the clutch in engagement and the rod 22 in the position shown in Fig. 2, the lock bolt may be moved downward a sufficient distance to break the circuit. The reason for preferring such arrangement is that there is preferably no ignition switch except the switch device as herein described. If an operator desired to stop the engine for a short period the lock bolt may be held downward by the foot of the operator breaking the circuit but this movement would not lock the clutch out at this period for the reason that the lock bolt will come into contact with the end of the member 22 and thus only the engine be stopped from running by breaking the ignition circuit. Upon release of the lock bolt to action by its spring and consequent establishment of the ignition circuit the engine is in condition to be started again by the usual starting mechanism.

By combining the switch for the ignition circuit and lock for the operating mechanism of the automobile in a single structure, the insurance hazard is very materially decreased which tends to reduce the insurance cost. The purpose and function of my improved lock structure is to prevent forgetfulness on the part of the operator to lock the automobile. The usual operator does not forget to turn the ignition switch to stop the engine before leaving the vehicle and with the arrangement herein described, it is only necessary for the operator to step on or otherwise force the lock bolt downward and to do this requires disengagement of the clutch and withdrawal of the rod 22. Thus, by the simple and practically automatic act of shutting off the engine in this structure, the vehicle is locked as well as the ignition circuit broken and it is believed to be broadly new to combine these several functions of locking a control part of the vehicle by a means simultaneously breaking the ignition circuit. It is also to be understood that various lock devices may be utilized other than such as is here preferably described but having the same general function to hold the lock in locked position and requiring a key to release the same.

Having thus fully described my invention, what I claim and desire to secure by Letters Patent of the United States is—

1. A device for preventing unauthorized use of an automobile having an internal combustion engine, an ignition circuit, a clutch between the engine and driving wheels, a spring tending to move the clutch to connect the engine and driving wheels, the combination therewith of a lock device including a case, a lock bolt slidable in the case, a bar slidable in the case at substantially a right angle to the lock bolt by movement of the clutch lever, the said bar on release of the clutch permitting the lock bolt to be moved to locked position, the bolt and bar cooperating to hold the clutch released, and means for breaking the ignition circuit by movement of the lock bolt to locked position.

2. A lock device for locking the clutch of an automobile in disengaged position comprising the combination with the clutch having a spring tending to engage the clutch and means operable at will for disengaging the clutch, of a bar movable upon actuation of the said operable means to disengage the clutch, a lock bolt movable to prevent return movement of the bar subsequent to disengagement of the clutch, a key operated lock movable with the bolt, and a spring to withdraw the bolt from the locked position when the lock is unlocked.

3. A lock device for automobiles comprising the combination with a clutch for connecting and disconnecting the power apparatus and the driving wheels and means for operating the clutch, of a lock device comprising a lock and a lock bolt movable as a unit to locked position to engagement with a part movable by disengagement of the clutch to hold the same disengaged, and a spring for returning the lock and bolt to unlocked position.

4. A lock device for the operating parts of an automobile, comprising the combination with a clutch and operating means therefor, of a lock case having an aperture therein, a bar riding in the aperture and movable by the clutch operating means, a lock bolt movable in an aperture extending across the bar aperture, the lock bolt being movable in front of the bar when the clutch is disengaged thereby preventing movement of the clutch when released.

5. A lock device for automobiles comprising the combination with an internal combustion engine having an ignition circuit, a clutch for connecting and disconnecting the engine and propeller shaft of the automobile, of a lock device including a bolt, a bar slidable by the clutch, the bar preventing movement of the bolt to locked position while the clutch is engaged and permitting movement of the bolt to locked position upon disengagement of the clutch, the lock bolt and bar cooperating to hold the clutch disengaged, a spring for automatically withdrawing the lock bolt when the lock is unlocked, and a switch for the ignition circuit opened by movement of the bolt to locked position and closed by movement of the bolt to unlocked position.

6. A lock device for automobiles comprising the combination with an internal combustion engine having an ignition circuit, a clutch for connecting and disconnecting the engine ad propeller shafts and means for operating the clutch, of a lock case, a bolt manually slidable in the case to locked position, a spring for moving the bolt to unlocked position, a key operated lock for releasing the bolt, a bar movable upon movement of the clutch to disengaged position permitting the lock bolt to be moved to locked position holding the bar from movement upon release of the clutch operating mechanism, and a switch in the ignition circuit opened by movement of the bolt to locked position.

7. A lock device for automobiles having an internal combustion engine, an ignition circuit and a clutch for engaging or disengaging the engine and the driving wheels, of a lock comprising a casing having an aperture at the lower end, a rod slidable in the aperture and movable by the clutch operating means, a lock bolt in the case and movable across the said aperture when the rod is moved outwardly therefrom on disengagement of the clutch, a switch for the ignition circuit having a part carried by the case and a part carried by the bolt whereby upon movement of the bolt to locked position the circuit is opened and upon movement to unlocked position the circuit is closed.

In testimony whereof, I sign this specification.

WALTER M. REASON.